United States Patent [19]

Rampolla

[11] 4,344,912

[45] Aug. 17, 1982

[54] METHOD OF INCREASING THE DETERRENT TO PROLIFERATION OF NUCLEAR FUELS

[75] Inventor: Donald S. Rampolla, Pittsburgh, Pa.

[73] Assignee: The United States of America as represented by the United States Department of Energy, Washington, D.C.

[21] Appl. No.: 159,891

[22] Filed: Jun. 16, 1980

[51] Int. Cl.$^3$ .......................... G21G 1/00; G21C 3/02
[52] U.S. Cl. .................................................. 376/180
[58] Field of Search ............................ 176/16, 17, 18; 252/627, 636–643; 376/180

[56] References Cited

U.S. PATENT DOCUMENTS

| | | | |
|---|---|---|---|
| 2,860,093 | 11/1958 | Wigner et al. | 176/18 |
| 2,900,228 | 8/1959 | Seaborg et al. | 176/16 |
| 2,954,335 | 9/1960 | Wigner | 176/18 |
| 3,208,912 | 9/1965 | Jaye et al. | 176/17 |
| 3,309,277 | 3/1967 | Jaye et al. | 176/17 |
| 3,714,322 | 1/1973 | Bell et al. | 252/636 |
| 4,018,697 | 4/1977 | Smith | 176/16 |

FOREIGN PATENT DOCUMENTS 873171 7/1961 United Kingdom .................. 176/16

OTHER PUBLICATIONS

Nuclear Industry, vol. 25, No. 9, (9/78) pp. 24–25.
En. Tech. Conf., 5th Proceedings, Wash., D.C. (2/78) pp. 103–110, Starr Nucleonics Week, vol. 19, No. 39 (9/28/78), p. 8.
Nuclear Applications, vol. 5, No. 5. (11/68) pp. 302–309, Lang DP-279, Formation of U-232 During Irradiation of Thorium St. John et al., pp. 1–17 (4/58).
BNL-483 (1/10/58), p. 40.

Primary Examiner—Sal Cangialosi
Attorney, Agent, or Firm—Judson R. Hightower; Richard G. Besha; James E. Denny

[57] ABSTRACT

A process of recycling protactinium-231 to enhance the utilization of radioactively hot uranium-232 in nuclear fuel for the purpose of making both fresh and spent fuel more resistant to proliferation. The uranium-232 may be obtained by the irradiation of protactinium-231 which is normally found in the spent fuel rods of a thorium base nuclear reactor. The production of protactinium-231 and uranium-232 would be made possible by the use of the thorium uranium-233 fuel cycle in power reactors.

4 Claims, No Drawings

METHOD OF INCREASING THE DETERRENT TO PROLIFERATION OF NUCLEAR FUELS

BACKGROUND OF THE INVENTION

1. Field of the Invention

This invention generally relates to the management of the nuclear fuel cycle for the purpose of decreasing the probability of proliferation of nuclear fuel. More specifically, it relates to a process for recycling protactinium-231 to enhance the utilization of uranium-232 in nuclear fuel for the purpose of making nuclear fuel more resistant to proliferation. The process can be used in light water reactors, heavy water reactors, high temperature gas cooled reactors, and fast breeder reactors.

2. Prior Art

The deterrent effect of high energy gamma rays associated with uranium-232 has long been recognized. The deterrence is caused both by the higher radiation emitted by uranium-232 and by the heat produced by high concentrations of this isotope of uranium. This heating effect is similar to the deterrent effect of heat produced by the addition of plutonium-238 to plutonium fuel as has recently been proposed and reported in an article entitled, "AGNS Proposes Proliferation Resistant Fuel Cycle" published in the trade journal *Nuclear Industry* in September of 1978, and which is hereby incorporated by reference. This article reports that, in the minimim plutonium mass required for a weapon, a concentration of 5% plutonium-238 would produce a surface temperature of about 875° C., thus posing difficult problems in accumulating and handling the critical mass of plutonium which could be used in the illicit manufacture of nuclear weapons.

U.S. Pat. No. 3,714,322 to Bell teaches a method for preparing high purity uranium-233. The method includes permitting the decay of protactinium-232 to uranium-232. However, Bell does not relate to a process for the production of uranium-232 for mixture with uranium fuel to make the fuel more resistant to proliferation. In addition, Bell discloses a process utilizing protactinium-232 rather than protactinium-231 as used in this invention. U.S. Pat. No. 2,900,228 to Seaborg et al relates to the production of uranium-233. As a step in the process of producing uranium-233, this reference discloses the utilization of uranium-233 and protactinium-233. However, this reference does not teach the separation of protactinium nor does it teach the conversion of the protactinium into uranium-232. U.S. Pat. No. 3,208,912 to Jaye et al, which is hereby incorporated by reference, teaches the use of thorium and enriched natural uranium or uranium-233 as a fuel for a nuclear power reactor. However, this reference does not disclose any processing of protactinium which normally appears in the spent fuel of reactors which utilize the thorium uranium fuel cycle.

Other prior art disclosures which relate to the field of the invention include the following: U.S. Pat. No. 2,954,335 to Wigner, U.S. Pat. No. 2,860,093 to Wigner, U.S. Pat. No. 3,309,277 to Jaye, U.S. Pat. No. 4,018,697 to Smith, British Patent No. 873,171 issued to the United Kingdom Atomic Energy Authority, and the following two monographs: "The Separation of Nuclear Power from Nuclear Proliferation," by Chauncey Starr, presented at the Fifth Energy Technology Conference, Washington, D.C., February 1978; and "Gilinsky Raises Plutonium Retransfer Doubts," *Nucleonics Week*, Sept. 28, 1978, page 8.

The problem of nuclear fuel proliferation, notably with fuels such as uranium and plutonium, has been a long standing one which has gained wide spread public attention and awareness. Therefore, a significant incentive for adequately coping with this problem exists.

SUMMARY OF THE INVENTION

In accordance with the present invention, recycle of protactinium-231 in a nuclear power reactor using thorium and uranium-233 or natural uranium as a fuel is disclosed. Protactinium-231 which appears in the spent fuel, is recovered and irradiated producing uranium-232. This uranium-232 is then added to a uranium fuel mixture which does not ordinarily contain uranium-232. Alternatively, the protactinium-231 which appears in the spent fuel is recycled completely or partially back into the thorium fuel to produce uranium-233 having a high concentration of uranium-232. By this method the deterrence to proliferation is increased by making the resultant fuels used in nuclear reactors less vulnerable to theft or misappropriation by making the said fuel more difficult to handle or transport because of the intense heat and high energy gamma rays emitted by the fuel.

DETAILED DESCRIPTION OF THE PREFERRED EMBODIMENTS

In the thorium fuel cycle protactinium-231 and uranium-232 are produced primarily by the following chain of neutron reactions:

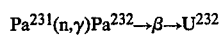

The pertinent decay data for these nuclides is as follows:

|            | Decay Mode | Half Life          |
|------------|------------|--------------------|
| $Th^{231}$ | $\beta$    | 26 hours           |
| $Pa^{231}$ | $\alpha$   | $3 \times 10^4$ years |
| $Pa^{232}$ | $\beta$    | 1.3 days           |
| $U^{232}$  | $\alpha$   | 72 years           |

The uranium-232 decay chain contains eight radioactive daughter nuclides. Six alpha particles are emitted in the declay from uranium-232 to stable lead-208. The alphas emitted from uranium-232 have energies of about 5.3 MeV. However, the total energy in the complete decay chain, from uranium-232 to stable lead-208, is about 42 MeV. This includes about 35 MeV for the six alpha particles and about 7 MeV for the beta particles and gamma rays which are also emitted. A portion of the above enumerated 7 MeV comes from two daughters of uranium-232, namely, thallium-208 and bismuth-212, which emit high energy gamma rays the energy range being from about 1.6 to 2.6 MeV.

Therefore, the presence of uranium-232 in nuclear fuel can serve as a deterrent to misappropriation both because of the high energy gamma rays emitted from the daughter products and because of the heat produced by the decay chain. The deterrent effect of high energy gamma rays associated with uranium-232 has long been recognized. However, the recycling of protactinium-231 in order to increase the production of uranium-232 has not been considered. Further, the deterrent effect of the heat produced by a high concentration of uranium-232 has not been heretofore taken into account. This heating effect is similar to the deterrent effect of heating produced by the presence of plutonium-238 in plutonium fuel as noted in the previously mentioned *Nuclear Energy* article.

The thorium fuel cycle may be used in light water reactors, heavy water reactors, high temperature gas cooled reactors, and fast breeder reactors. Recycling or recovery of protactinium-231 is theoretically possible for any of these reactors. Irradiation of protactinium recovered from the thorium fuel cycle may also be accomplished in reactors which operate on the uranium or plutonium fuel cycle. However, this disclosure presents calculations only for light water reactors. Two types of light water reactors are considered. The first type is called a pre-breeder, and is fueled with thorium and moderately enriched natural uranium. The second type is called a breeder and is fueled with thorium and uranium-233. Pre-breeder reactors are operated to produce heat for the generation of electricity, and also to produce uranium-233 for the initial fuel charge for breeder reactors. Breeder reactors are self-sustaining, that is, once a breeder reactor is operating to produce heat for the generation of electricity, it also produces as much uranium-233 as it consumes.

Preliminary depletion calculations have been made on conceptual light water pre-breeder and breeder cores to establish the potential for the production of both protactinium-231 and uranium-232. The calculations assume a reactor with a thermal power rating of 3000 MW thermal (equivalent to 1000 MW electrical) and operating at an 80% load factor. The important features of these reactors are presented in Table 1 below.

|  | Fuel[a] Volume Coolant Volume | Core Volume (cm3) | Thorium Loading (MT) | Fraction of Core Refueled Each Year | Number of Modules |
| --- | --- | --- | --- | --- | --- |
| Pre-breeder | .504 | $2.85 \times 10^7$ | 75 | ⅓ | 88 |
| Breeder | 1.86 | $6.36 \times 10^7$ | 280 | ⅓ | 157 |

[a]Fuel volume comprises only fuel pellets.

The results of the calculations are as follows: Pre-breeders would produce about 2.3 kg per year of protactinium-231. However, breeders would produce about 6.1 kg per year. Neutron irradiation of separated protactinium-231 could be conducted efficiently to convert protactinium-231 to uranium-232. For instance, a one year irradiation of protactinium-231 in special rods in a pre-breeder reactor would convert about one third of the protactinium-231 to uranium-232. However, about 10% of this produced uranium-232 would be destroyed by neutron capture within the reactor. Allowing for reasonable reprocessing and fabrication losses of about 2% at each step results in the conclusion that about 80% of the protactinium-231 produced in pre-breeders or breeders is made available as uranium-232 for adding to an uranium fuel. Fuel for conventional light water reactors could be mixed or "spiked" with uranium-232 in order to discourage attempts to bring the enrichment up to weapons grade level. Assuming that the enrichment is approximately 3.2% and the "spike" is 1000 ppm uranium-232 in uranium-235, the pre-breeder and breeder annual outputs of protactinium-231 would provide enough uranium-232 to "spike" from 2 to 5 annual fuel reloadings of a conventional 1000 MW electrical reactor. Alternatively, all or part of this protactinium-231 can be recycled into pre-breeder or breeder fuel in order to increase the concentration of uranium-232 in the uranium-233. If all of the protactinium-231 produced by a pre-breeder were recycled into pre-breeder fuel, the concentration of uranium-232 in uranium-233 would increase to approximately 12,000 ppm or more. Approximately the same concentration would result if all of the protactinium-231 produced by a breeder were recycled into breeder fuel. The effect on fissile inventor ratio of the breeder would be insignificant.

It should be noted that the heating rate due to alpha particles from the uranium-232 decay is supplemented by alpha particles, betas and gammas which result from the decay of the daughter products. The ratio of decay energy from uranium-232 plus the energy arising from the decay of the daughters to the decay energy of uranium-232 alone is given in Table 2 below.

| Ratio: $\frac{\text{Energy from Decay of U-232 + Daughters}}{\text{Energy from Decay of U-232}}$ | |
| --- | --- |
| Years After Separation of U-232 From Daughter Products | Ratio |
| 0.5 | 2.2 |
| 1.0 | 3.1 |
| 1.5 | 3.9 |
| 2.0 | 4.6 |
| 3.0 | 5.6 |
| 4.0 | 6.3 |

For example, one year after separation from the daughter products, this ratio is approximately 3 to 1. Since the half life of uranium-232 is shorter than that of plutonium-238, one year after the separation of the uranium-232 from the daughter products, the heating rate due to 1% uranium-232 in uranium would be equivalent to the heating rate due to 3.6% of plutonium-238 in plutonium in the process described previously. If 100% of the protactinium-231 produced by a breeder reactor were recycled into the reactor fuel, the radiation level for a typical fresh breeder module would be approximately 200 roentgens per hour at a distance of one meter. By contrast, the radiation level for a typical fresh breeder module without recycling of protactinium-231 would be approximately 48 roentgens per hour at a distance of one meter. This increased level of radiation would therefore act as a deterrent to the theft or concealment of nuclear fuel.

The process disclosed herein for adding uranium-232 to nuclear fuel could be combined with other known methods for making nuclear fuels highly radioactive. For instance, in the *Nuclear Industry* trade journal article referenced above, the addition of neptunium-237 to nuclear fuel was discussed. "Spiking" fuel with a combination of neptunium-237 and uranium-232 would produce a fuel element with excellent diversion resistance. Spiking fuel with uranium-232 could also be combined with the known CIVEX process to make fuel with improved long term misappropriation resistance. The CIVEX process has as an input the stored spent fuel from light water reactors. The output of this process is radioactively hot refabricated fuel ready for insertion into reactors. In the processing stage, highly radioactive elements of the spent fuel are added to the replenished new fuel for the reactors. Thus, the fresh fuel contains a fraction of the fission products in a mixture of uranium and plutonium, and such fresh fuel can be remotely fabricated as the final stage of the CIVEX plant. Combining this process with the addition of uranium-232 into the fuel could overcome some of the criticisms of the CIVEX process, the main criticism being that, although the CIVEX process produces fuel containing certain radioactive fission products, these fission products have relatively short half lives such that, within one year and a half to four years after fabrication of the fuel, the fuel loses its proliferation resistance. On the other hand, the concentration of radioactive daughter products of uranium-232 in the process disclosed herein increases within this time frame, and the uranium-232 itself has a half life of 72 years. Thus, in fresh fuel containing a combination of the CIVEX fission products and uranium-232, the decrease in the radioactivity from the CIVEX fission products is compensated by the buildup of the radioactivity from the uranium-232 daughter product. In cases where protactinium-231 is neutron irradiated separately to produce uranium-232 for use as a "spike," thorium-228 produced by decay of the uranium-232 may be recovered along with the uranium-232 and used as part of a "spike."

Modification of the invention may be possible without departing from the spirit and the scope of the appended claims.

I claim:

1. In a method for increasing the proliferation deterrence of a thorium and uranium-233 nuclear fuel mixture by increasing the radiation level and surface temperature thereof, the improvement comprising: separating the protactinium-231 from the spent fuel and recycling at least a portion of the separated protactinium-231 back into the thorium and uranium-233 fuel mixture, where the recycled protactinium-231 is converted into uranium-232 with a concentration in the fuel mixture of approximately 1.2%.

2. The method of claim 1 wherein the thorium and uranium-233 fuel mixture is in a light water reactor operating as a prebreeder.

3. The method of claim 1 wherein the thorium and uranium-233 fuel mixture is in a light water breeder reactor.

4. In a method for increasing the proliferation deterrence of a thorium and uranium-233 nuclear fuel mixture by increasing the radiation level and surface temperature thereof, the improvement comprising: separating the protactinium-231 from the spent fuel, irradiating the protactinium-231 to produce uranium-232, and adding the uranium-232 to a thorium and uranium-233 fuel mixture to a concentration of approximately 1.2%.

* * * * *